(12) United States Patent
Quist et al.

(10) Patent No.: US 7,598,858 B2
(45) Date of Patent: Oct. 6, 2009

(54) METHODS, APPARATUSES, AND SYSTEMS FOR MONITORING ENVIRONMENTAL PARAMETERS WITHIN AN ENCLOSURE

(75) Inventors: Gregory M. Quist, Escondido, CA (US); David A. Drake, Escondido, CA (US)

(73) Assignee: Hadronex, Inc., Escondido, CA (US)

( * ) Notice: Subject to any disclaimer, the term of this patent is extended or adjusted under 35 U.S.C. 154(b) by 295 days.

(21) Appl. No.: 11/641,110

(22) Filed: Dec. 19, 2006

(65) Prior Publication Data
US 2007/0159326 A1    Jul. 12, 2007

Related U.S. Application Data

(60) Provisional application No. 60/753,019, filed on Dec. 22, 2005.

(51) Int. Cl.
*G08B 23/00* (2006.01)
(52) U.S. Cl. .............................. 340/539.26; 340/545.6; 340/539.22; 340/531
(58) Field of Classification Search ............ 340/539.26, 340/545.6, 539.22, 539.1, 531, 539.31, 568.1, 340/568.2, 568.7, 550, 612; 73/314, 317, 73/306, 312, 861.8, 861.27
See application file for complete search history.

(56) References Cited

U.S. PATENT DOCUMENTS

| | | | | |
|---|---|---|---|---|
| 5,448,220 A * | 9/1995 | Levy | ............... | 340/539.26 |
| 5,835,012 A * | 11/1998 | Wilk | ............... | 340/539.26 |
| 7,002,481 B1 * | 2/2006 | Crane et al. | ............. | 340/618 |
| 7,040,139 B2 * | 5/2006 | Sunshine | ............. | 73/23.2 |
| 7,221,282 B1 * | 5/2007 | Ross et al. | ............. | 340/618 |
| 2004/0084359 A1 * | 5/2004 | Pasko | ............. | 210/97 |

* cited by examiner

*Primary Examiner*—Toan N Pham
(74) *Attorney, Agent, or Firm*—The Nath Law Group; Jerald L. Meyer; Jonathan A. Kidney (57) ABSTRACT

An apparatus for monitoring environmental parameters within an enclosure includes a power source; a communication device electrically connected to the power source and attachable to a cover of the enclosure; and a sensor suspended away from the cover of the enclosure. A method for providing a monitor of environmental parameters within an enclosure includes attaching a communication device to a cover of the enclosure, connecting the communication device to a power source; and suspending a sensor away from the cover of the enclosure. A method for monitoring environmental parameters within an enclosure includes monitoring one or more environmental parameters with a sensor suspended by a cable within an enclosure, and transmitting data representing one or more monitored environmental parameters from a communication device to a second communication device.

20 Claims, 7 Drawing Sheets

METHODS, APPARATUSES, AND SYSTEMS FOR MONITORING ENVIRONMENTAL PARAMETERS WITHIN AN ENCLOSURE

This application claims the benefit of U.S. Provisional Application No. 60/753,019 filed Dec. 22, 2005. The aforementioned provisional application's disclosure is incorporated herein by reference in its entirety.

FIELD OF THE INVENTION

The present inventive subject matter relates to methods, apparatuses, and systems for monitoring environmental parameters.

BACKGROUND OF THE INVENTION

Current methods for the monitoring of environmental parameters in enclosures suffer from one or more of the following problems: (a) access requires entry into the enclosure, thus high cost and higher safety risk; (b) systems often require wired communications and continuous power, which must be trenched around the enclosure; (c) installation and moving of equipment is costly, limiting the deployment of such sensing systems; and (d) attachment to existing structures can limit monitoring to poor locations within an enclosure.

It is clear that a distinct need exists for a low cost, robust system, method and apparatus for monitoring environmental parameters within enclosures, with an easy and flexible attachment and suspension system which may be easily modified, repaired, or moved.

SUMMARY OF THE INVENTIVE ASPECTS

The present inventive subject matter relates to an apparatus for monitoring environmental parameters within an enclosure. The apparatus includes a power source, a communication device electrically connected to the power source and attachable to a cover of the enclosure, and a sensor suspended away from the cover of the enclosure.

In some embodiments, the apparatus includes a cable which suspends the sensor away from the cover of the enclosure. In some embodiments, the cable has an electrical connection between the sensor and the power source, and a communicative connection between the sensor and the communication device. In some embodiments, the apparatus has an additional attachment mechanism attached to the cover of the enclosure. In some embodiments, the cable descends from the additional attachment mechanism. In some embodiments, the additional attachment mechanism is detachable from the cover of the enclosure, such that the additional attachment mechanism may be moved from time to time to improve the position of the sensor.

In some embodiments, the apparatus further includes a second sensor attached to the cable, wherein the sensor and the second sensor are apart from each other along the cable. In some embodiments, the cable has an electrical connection between the second sensor and the power source, and a communicative connection between the second sensor and the communication device.

In some embodiments, the apparatus further includes at least one further sensor or sensors attached to the cable, wherein the further sensor(s) is/are apart from the first sensor and the second sensor. In some embodiments, the cable has an electrical connection between the further sensor(s) and the power source and a communicative connection between the further sensor(s) and the communication device.

In some embodiments, the sensor is connected to a second power source and a wireless communicator for communicating wirelessly with the communication device.

In some embodiments, the apparatus includes a processor connected to the power source. In some embodiments, the sensor is connected to the communication device by way of the processor.

In some embodiments, the communication device is a wireless communication device which communicates with at least a second communication device outside of the enclosure.

In some embodiments, the sensor monitors one or more of the following environmental parameters: humidity, moisture, temperature, gas content, water level, water quality, flow rates, vibration, acoustic levels and content, optical levels and content, and opening or closing of the enclosure cover.

In some embodiments, the sensor conducts real-time, continuous sensing.

In some embodiments, the sensor is connected to a wireless communicator for communicating wirelessly with the communication device.

In some embodiments, the sensor is configured to sense one or more environmental parameters selected from the group consisting essentially of: power current flow, power voltage, telecommunications measurements, natural gas pressure, natural gas flow, petrochemical pressure, petrochemical flow, security measurements, fire detection, chemical detection, biological detection, fluid level detection, fluid flow detection.

In some embodiments, the apparatus includes the cover of the enclosure.

In some embodiments, the power source, the communication device, and the sensor are positioned so as to be movable with the cover of the enclosure.

In some embodiments, the power source is located outside of the enclosure.

The present inventive subject matter also relates to a method for providing a monitor of environmental parameters within an enclosure. The method includes the steps of attaching a communication device to a cover of the enclosure, connecting the communication device to a power source, and suspending a sensor away from the cover of the enclosure.

In some embodiments, the connecting step includes connecting the communication device to the power source by way of a cable.

In some embodiments, the method includes the step of placing the sensor in communication with the communication device.

In some embodiments, the method includes the step of providing an electrical connection between the sensor and the power source by way of the cable.

In some embodiments, the method includes the step of providing a communicative connection between the sensor and the communication device by way of the cable.

In some embodiments, the method includes the step of attaching an additional attachment mechanism to the cover of the enclosure. In some embodiments, the suspending step includes suspending the sensor from the additional attachment mechanism.

In some embodiments, the method includes the steps of removing a cover from the enclosure, and covering a second enclosure with the cover. In some embodiments, the sensor is suspended by the cable from the cover.

The present inventive subject matter also relates to a method for monitoring environmental parameters within an enclosure. The method includes the steps of monitoring one or more environmental parameters with a sensor suspended by a cable within an enclosure, and transmitting data from a communication device to a second communication device, the data representing one or more monitored environmental parameters.

In some embodiments, the method includes the steps of removing a cover from the enclosure, and covering a second enclosure with the cover. In some embodiments, the sensor is suspended by the cable from the cover.

The present inventive subject matter also relates to a system for monitoring environmental parameters within an enclosure. The system includes means for monitoring one or more environmental parameters, means for suspending the monitoring means within an enclosure, and means for transmitting data to a communication device outside of the enclosure. In some embodiments, the data represents one or more monitored environmental parameters.

BRIEF DESCRIPTION OF THE FIGURES

In the detailed description of the invention presented below, reference is made to the accompanying drawings in which.

DETAILED DESCRIPTION OF THE INVENTION

In the following detailed description, reference is made to the accompanying drawings, which form a part hereof, and in which are shown by way of illustration specific embodiments in which the invention may be practiced. In this regard, terminology such as "first," "then," "afterwards," "before," "next," "finally," "above," "below," "top," "bottom," "front," "back," "leading," "trailing," etc., is used with reference to the drawing being described. Because the processes and methods of the present invention can be performed in a number of different orders, and because the individual elements of the apparatus and systems of the present invention may be configured in a number of different orders, the above terminology is used for purposes of illustration and is in no way limiting. It is to be understood that other embodiments may be utilized and logical changes may be made without departing from the scope of the present invention. The following detailed description, therefore, is not to be taken in a limiting sense, and the scope of the present invention is defined by the appended claims.

Although a number of discrete embodiments are described below, it is to be understood that these are merely non-limiting examples, and that any given embodiment of the invention may comprise some of the features of one shown embodiment, and/or some of the features of another shown embodiment. For example, although an external power source 168 is only shown in FIG. 2, it could easily be used in the embodiments of FIG. 3 or FIG. 4 in lieu of the power source 108. Other modifications between embodiments will be clear to one skilled in the art upon reading the following disclosure.

Sensors may be used to provide timely and accurate real time measurements to detect risks, operational problems and for optimization of processes. Process functions can include water supply, waste water collection and treatment, recycled water management, storm drain management, electric power distribution, telecommunications monitoring, security applications, natural gas distribution, petroleum recovery, steam distribution, chilled and heated water distribution, heating ventilation and air conditioning, renewable energy resource control, industrial processes and related applications.

Attaching sensors to external enclosure covers such as manholes or doors may expose sensors to difficult environments associated with the enclosure location including, but not limited to: moisture; humidity from condensation from the surrounding atmosphere; dust; vibration, chemical exposure, frequent access, vandalism, etc. Other means of providing sensors in manholes include direct mounting of the sensors in the manhole (see, for example, FloDar™ by Marsh-McBirney, Frederick, Md.) and hanging sensors from a pre-existing ladder (see, for example, the CF-316 by Flo Line Options Corp., Medina, Ohio). The problem with direct mounting of sensors in the manhole is that it can be labor intensive, often requiring at least three field personnel with safety harnesses and enclosed space gear; also, it is expensive often requiring trenching; and the sensors cannot be easily moved from one manhole to another. Hanging sensors from the walls or ladder in a manhole make entrance to the manhole more difficult, and creates a hazard in an emergency situation when the manhole requires rapid entry. In addition, it is difficult to properly place sensors by hanging them on walls or existing ladders that are already fixed in position.

The present invention solves the problems associated with both environmental issues associated with the outside environment and securing the sensors either directly to the walls or other appurtenances in the enclosure location by remotely locating the sensors from the electronics, power, and communications means which are attached to the enclosure cover. As an application for this invention, sensors may be suspended from manhole covers that cover a vertical shaft or vault, such that the sensors hang from the manhole cover away from the external environment and closer to the locations of interest for the measurement.

Figure 1:
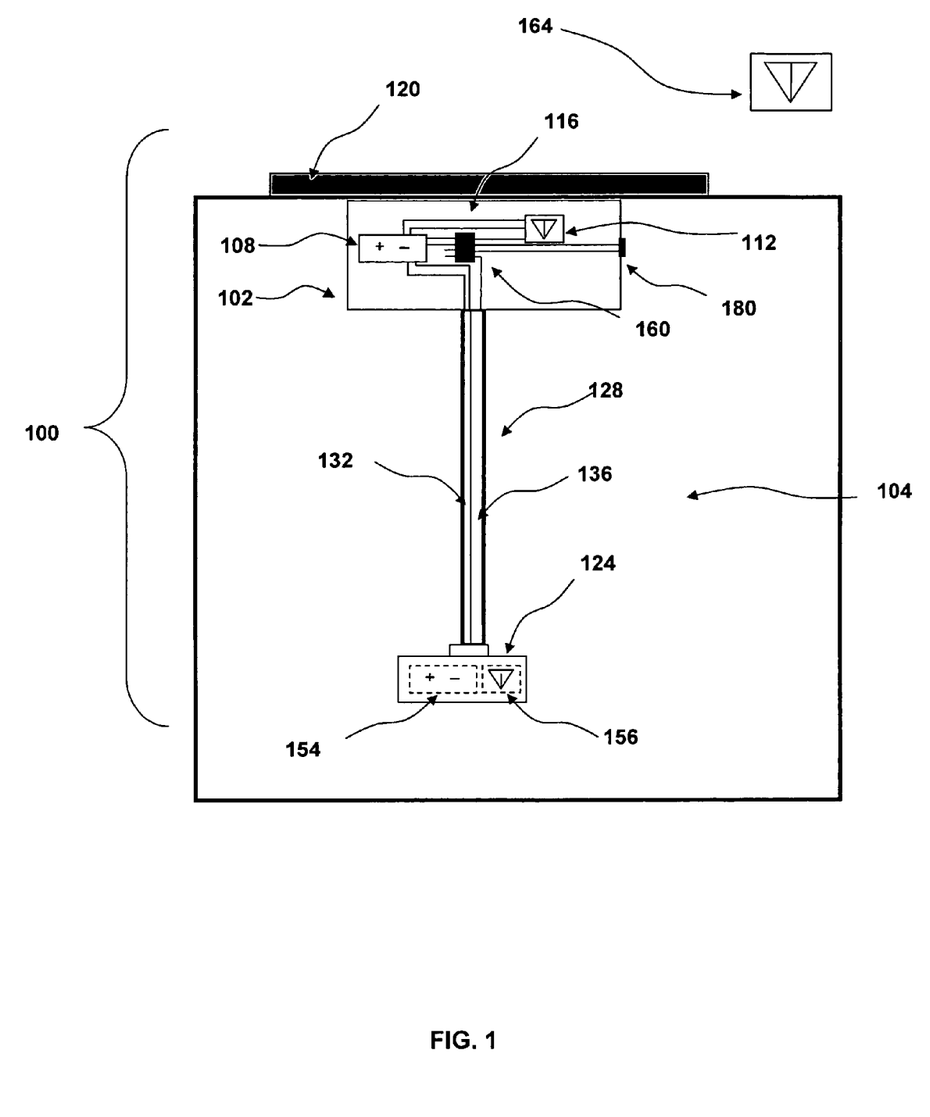
FIG. 1 shows an embodiment for an apparatus for monitoring environmental parameters within an enclosure.

In FIG. 1, an apparatus 100 for monitoring environmental parameters within an enclosure 104 is shown. The enclosure 104 may be, as non-limiting examples, a manhole, or may be any other enclosure in which monitoring is to occur, such as a room, house, crawlspace, duct, pipe, channel, conduit, or tank.

The enclosure 104 is covered by a cover 120. The word cover 120 used herein is not meant to imply full coverage of an opening of the enclosure 104, or that the enclosure 104 would be open in the absence of the cover 120. The cover 120 may be a manhole cover, or may be, as non-limiting examples, any other appropriate cover of a given enclosure, such as a window, door, lid, or hatch. The cover 120 may be provided as part of the apparatus 100, or the apparatus 100 may attach to a pre-existing cover 120. The cover 120 may only partially cover the enclosure 104, or may be a panel or other constituent element of the enclosure 104.

The apparatus 100 includes a power source 108. The power source 108 may be, as non-limiting examples, a battery, fuel cell, or any other appropriate generator or repository of energy. The power source 108 may be entirely self contained, and may be rechargeable or replaceable. Alternatively, the power source 108 may instead derive its power from outside of the enclosure (as non-limiting examples, from a connection to an external power source on the power grid or from solar panels), or may derive its power from inside of the enclosure (as non-limiting examples, from a connection to an external power source on the grid or from hydroelectric power derived from fluid flow within the enclosure or any other source of renewable energy available at or in the enclosure).

The apparatus 100 also includes a communication device 112. The communication device 112 may, as a non-limiting example, be a wireless transmitter, or may communicate via wires. The communication device 112 may communicate via any number of known protocols, including, as non-limiting examples, Ethernet, CDMA, GSM, TDMA, Bluetooth, 802.11b, 802.11g, Reflex25, Reflex50, ZigBee, RFID, an analog modem connection, or any other protocol. The communication device 112 is electrically connected to the power source 108 by wires 116. Although shown as separate elements in the figure, it should be noted that communication device 112 and power source 108 may be housed in the same body or provided as one device. The communication device 112 may be configured to communicate with another communication device 164 outside of the enclosure 104. In this way, the communication device 112 may relay the measurements of the sensor 124 or other sensors from within the enclosure to those outside of the enclosure. As non-limiting examples, the communication device 164 may be a relaying device, an internet connection, a telephone modem connection, a monitoring station, or any other device for receiving wired or wireless communications from communication device 112. The communication device 112 may send signals periodically, at the occurrence of an event generating a real-time alarm, or both.

The communication device 112 may also be configured to receive information from the same or another communication device 164 outside of the enclosure. In this way, the communication device may receive commands from outside of the enclosure. These commands may, as non-limiting examples, include: commands to reset or vary the activation or alarm thresholds of the various sensors 124; commands to vary the alarm behavior of the sensors 124; commands to control the integration of information from the various sensors 124, software or firmware updates for the processor 160, communication device 112 or other devices, and polling requests for sensor information. When communication is sent by the communication device 112 to another communication device 164, this communication may be confirmed by the receiving communication device 164 by a return transmission. Any data errors, which may as a non-limiting example be identified by a CRC redundancy check or upon receipt of logically incomplete information, can be cured by the receiving communication device 164 requesting retransmission from the originating communication device 112. The same method of error correction may also be performed in reverse. For example, if the communication device 112 identifies errors in a firmware update sent from communication device 164, device 112 may request retransmission. Many other advantages to having the communication device receive transmissions from outside of the enclosure will be realized by those skilled in the art.

Communication device 164 may be in communication with software and/or computer hardware for management of the data provided by the sensors 124, and for providing user interfaces for configuration of the apparatuses connected to the communication device 164. This software and/or hardware may collect and combine and/or decommutate information from the various sensors, manage this data in a relational database, and/or provide this information to a user.

The communication device 112 may be attached to the cover 120 of the enclosure 104. The communication device 112 may be attached by any appropriate attachment mechanism. As non-limiting examples, the communication device 112 may be directly attached to the cover 120 by glue, threaded bolts, rivets, metal screws, tape, epoxy, staples, nails, adhesive strips, or magnets. As a non-limiting example, the communication device 112 may be attached to the cover 120 by neodymium magnets. The attachment mechanism may lend itself to repositioning, or may be attached so as to be difficult to reposition once a position has been selected.

The communication device 112 alternatively be attached to the enclosure cover 120 by way of package 102. Package 102 may hold one or more of elements such as the communication device 112, power source 108, wires 116, a processor 160, or other electronics and elements. The package 102 may protect these elements from exposure to the enclosure 104. The package 102 may be made of any material, including (as non-limiting examples) various metals or plastics, and may entirely contain the above elements or may contain only some of these elements. Whether or not in a package 102, the power source 108, the communication device 112, and the sensor 124 may be configured or positioned so as to be movable with the cover 120 of the enclosure 104. In this way, the cover 120 may be removed and placed at a different enclosure, and the apparatus 100 and associated sensor 124 will then be easily transplanted into this different enclosure. The package 102 may also include one or more ports 180 for communication with the processor 160 or other components. These ports 180 may be analog or digital, and may be in communication with the processor 160 or directly with the other components. The ports may have a custom configuration, or may be of a standard type (such as, as non-limiting examples, USB ports, serial ports, RS-232 ports, digital optical ports, single-wire ports, or other types of ports). The processor 160 may operate an interface program for proper communication with a device attached to the port 180. These ports 180 may be used in reprogramming the components, or in retrieving data from the components. The ports 180 may serve as an important backup for retrieving information from the sensors 124 should the communication device 112 fail to operate correctly. The ports 180 may be disposed at the side of the package 102 as shown, or at the top 104 of the enclosure 100. Even if no package 102 is used, the apparatus disclosed herein may still include a communication port 180.

The apparatus 100 also includes a sensor 124 for performing samples, measurements, sensings, or monitorings within the enclosure. The sensor 124 may be suspended away from the cover 120 of the enclosure 104, although the distance from the cover 120 of the enclosure 104 may be relatively short or long compared to the size of the enclosure 104. The location of the sensor 124 in these figures is shown purely as a non-limiting example, and the sensor may be placed at any height, depth, or location within the enclosure. Indeed, such locations may be optimal, depending on what the sensor 124 or other sensors measures. By suspending the sensor 124 away from the cover 120, the sensor 124 may be protected from interference from the edges of the enclosure 104 or from outside of the enclosure 104, such as (as non-limiting examples) very high or very low temperatures, high vibration, high dust, high moisture due to outside precipitation, a condensing environment due to potentially high humidity of the enclosure 104, and/or temperature differential between the enclosure 104 and the outside environment. The sensor 124 may sample or monitor (as non-limiting examples) humidity, moisture, temperature, gas content, water level, water quality, flow rates, vibration, acoustic levels and content, optical levels and content, opening or closing of the enclosure cover, power current flow, power voltage, telecommunications measurements, natural gas pressure, natural gas flow, petrochemical pressure, petrochemical flow, and/or security measurements. The sensor 124 may perform (as non-limiting examples) fire detection, chemical detection, biological detection, fluid level detection, fluid flow detection, or other hazard detections. The sensor 124 may be, as non-limiting examples, an ultrasonic level sensor (as a non-limiting example, a Mini-SE by SensComp, Livonia Mich.), or a hydrogen sulfide sensor to detect hydrogen sulfide gas in the enclosure. The sensor 124 may conduct real-time continuous sensing, periodic sensing, or may only take a measurement when commanded by an external device (such as the processor 160). The sensor 124 may report its measurements at any desired rate. A variety of sensors may be used for long-term data logging, for real-time alarm generation, or for both.

The apparatus may include a processor 160. Although shown as one element here, the processor 160 may include one or more of the following, as non-limiting examples: a printed circuit (PC) board computer, an analog to digital converter, a logic circuit, memory for storing measurements or samples, or other electronic components. The processor 160 may optionally be in communication with the power source 108, the communication device 112, the sensor 124, or any other element of the apparatus 100. The processor may perform various functions, including (as non-limiting examples) accumulation of sensor data, computation of combined variables based on sensor data, dynamic filtration of sensor data to minimize false alarms, identification of sensor data above an alarm threshold, reprogramming of the sensor software or firmware, identification of a faulty sensor, and configuration of a sensor. To provide desired flexibility, the processor 160 may be disposed as part of a local general-purpose computer, although depending on task demands a single processor 160 may be sufficient to perform the above tasks. Sensor data may be used for real time alarm generation or for long term data acquisition and logging for operational planning purposes. As a non-limiting example of operation, the sensor or sensors 124 may provide data, which is structured and marshaled by the processor 160, and then written to the communication device 112 in byte-serial format. Alternatively, the sensors 124 may provide data directly to the communication device 112 in byte-serial format. Alternatively, data may be provided in a longer format.

As the power source 108 may provide power to the communication device 112, the sensor 124, the processor 160, or any other element of the apparatus 100, steps may be taken to minimize system power consumption, thereby increasing "battery life" or the time between recharging or replacing the power source 108. For example, any of the above components may be chosen to minimize power consumption, or to "sleep" when not in use. In addition, the power source 108 can be configured in careful calibration with the components so as to supply regulated power across its lifetime.

The apparatus 100 may include a cable 128 which suspends the sensor 124 away from the cover 120 of the enclosure 104, although other means of suspension may be used, including (as non-limiting examples) rigid support arms. The cable 128 may be unshielded, or may be shielded or encased in metal, rubber, or plastic. The cable 128 can include an electrical connection 132 between the sensor 124 and the power source 108. The cable can also include a communicative connection 136 between the sensor 124 and the communication device 112. Either or these connections may be made through the processor 160 or independent of the processor. The communicative connection 136 may represent measurements from the sensor 124 through a simple mechanism like a TTL line signal or line voltage, or may utilize any communication protocol, such as those listed above or others.

Although the cable 128 is described as including a communicative connection 136 and an electrical connection 132, it should be emphasized that these are optional, and that the sensor may itself include a power source 154 or a wireless communicator 156. As above, this power source 154 may be, as non-limiting examples, a battery, fuel cell, or any other appropriate power source. The power source 154 may be entirely self contained, and may be rechargeable or replaceable. Alternatively, the power source 154 may instead derive its power from outside of the enclosure (as non-limiting examples, from a connection to an external power source on the power grid or from solar panels), or may derive its power from inside of the enclosure (as non-limiting examples, from a connection to an external power source on the grid or from hydroelectric power derived from fluid flow within the enclosure or any other source of renewable energy available at or in the enclosure). Alternatively, the sensor may need no power at all, or may be self powered by the medium in which it is placed (as a non-limiting example, flowing water). The wireless communicator 156 may communicate with the communication device 112 wirelessly, and relay measurements made by the sensor 124 to the communication device 112. Alternatively, where such reception is available or desired, the wireless communicator 156 may communicate directly with communication device 164. As above, the wireless communicator 156 may communicate via any number of known protocols, including, as non-limiting examples, Ethernet, CDMA, GSM, TDMA, Bluetooth, 802.11b, 802.11g, Reflex25, Reflex50, ZigBee, RFID, an analog modem connection, or any other protocol. It may be powered by power source 108, power source 154, or any other power source.

Figure 2:
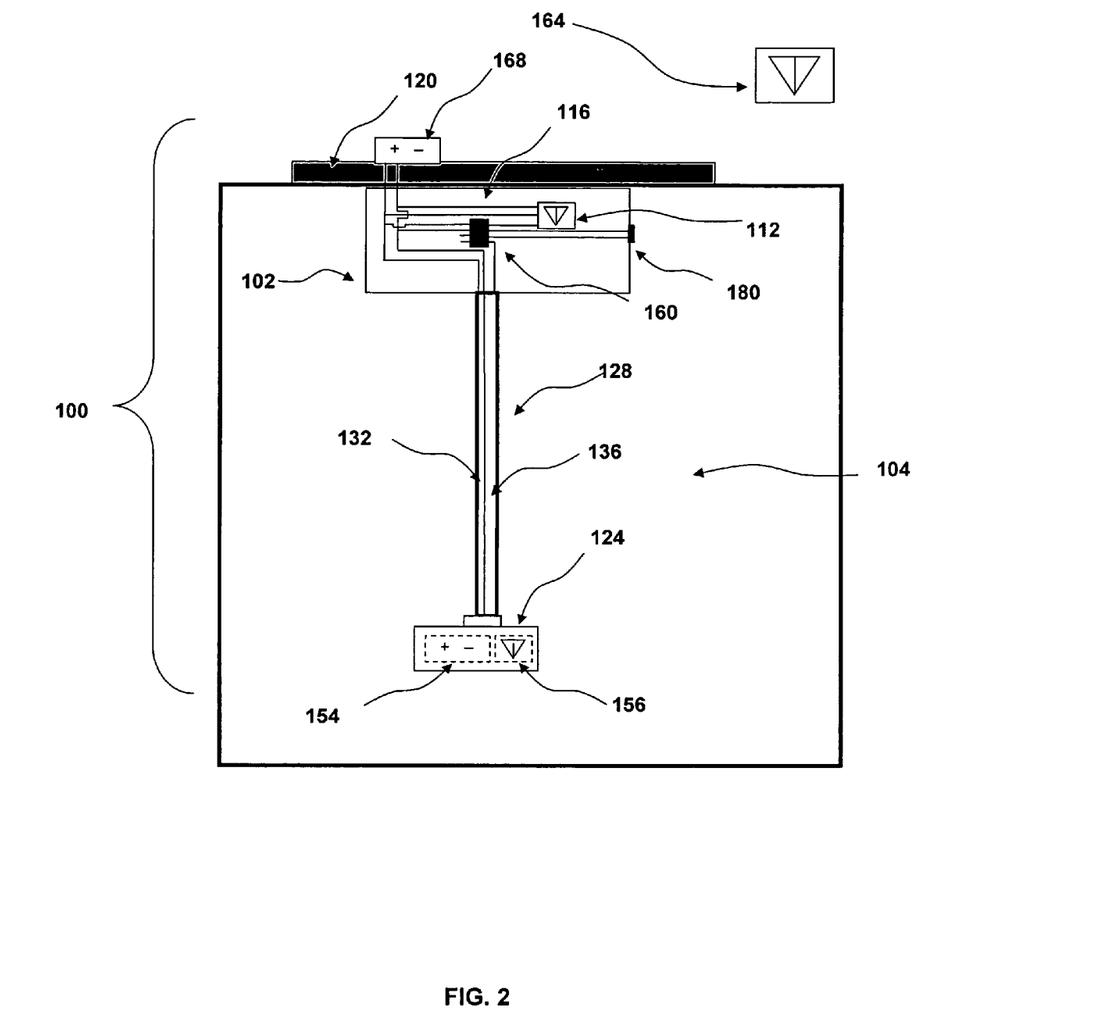
FIG. 2 shows another embodiment for an apparatus for monitoring environmental parameters within an enclosure.

An alternative embodiment is shown in FIG. 2, in which an external power source 168 is located outside of the enclosure 104, and power is delivered to the device through the cover 120 of the enclosure 104. This power may be delivered by wires, by induction, or by any other desired method. The external power source 168 may, as above, derive its power from various methods outside of the enclosure (as non-limiting examples, from a connection to an external power source on the power grid or from solar panels). This external power source 168 may of course be protected from the elements to which it may be exposed outside of the enclosure 104. The power source may optionally be attached to the cover 120 of the enclosure 104.

Figure 3:
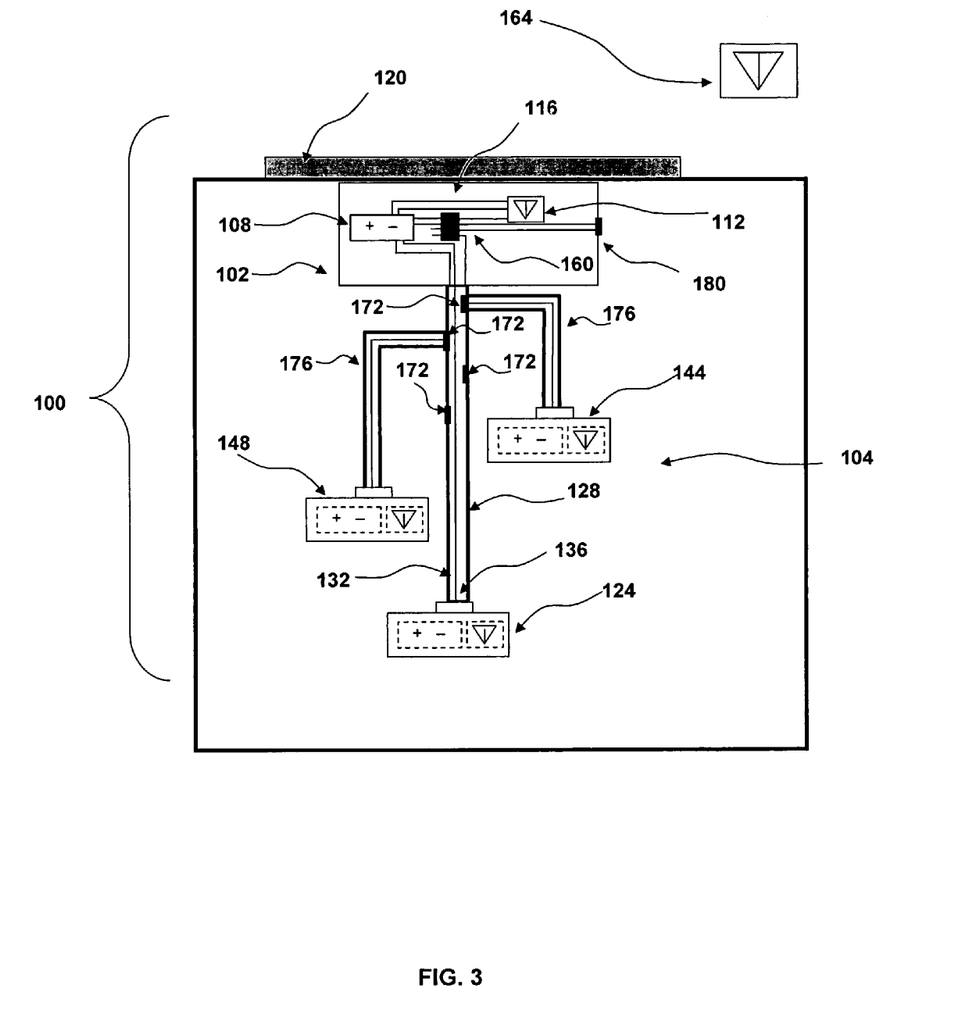
FIG. 3 shows another embodiment for an apparatus for monitoring environmental parameters within an enclosure.

A further alternative embodiment is shown in FIG. 3, in which a second sensor 144 and further sensor 148 are shown suspended along the same cable 128. As above, the cable 128 may provide an electrical connection 132 between one or more of the sensors 124, 144, 148 and the power source 108. The cable 128 can also include a communicative connection 136 between one or more of the sensors 124, 144, 148 and the communication device 112. The second sensor 144 and the further sensor 148 may be apart from the first sensor 124 on the cable, although it should be clear that any number of sensors may be attached, and may be placed anywhere relative to the enclosure 104 and to each other. As above, one or more sensor 124, 144, 148 may comprise its own power source, wireless communicator, or both, or may use the connections 132, 136 provided on the cable. The sensors may communicate with each other, with the wireless communication device 112, with the processor 160, or directly with the outside communication device 164. The sensors may be suspended from cables 176 which branch off from the main cable 128 as shown. As a non-limiting example, the main cable 128 may comprise one or more ports 172 along its length, at which these branch cables 176 attach. Not all ports 172 need to be used at one time, as shown, although the system could alternatively be designed so that all the ports must be used. These branch cables may comprise none, some, or all of the connections carried by the main cable 128.

Alternatively, the additional sensors 144, 148 could be attached directly to the main cable 128 at the ports 176, or could be suspended from one or more additional cables which connect directly to the processor 160, communication device 112, or other electronics at the cover 120 of the enclosure 104, or could be attached at a separate location anywhere in the enclosure 104. Alternatively, the cable 128 may be manufactured or wired as a forked cable, with terminuses for multiple sensors. These are non-limiting examples, and the sensors 144, 148 may attach to the main cable 128 or to the electronics in many different ways. These multiple sensors 144, 148 may be used either to measure the same parameter at different heights in the enclosures (for example water level), or may be different sensors used to measure different environmental parameters in the enclosure 104. As a non-limiting example, the apparatus 100 could include float switches (for example, as sensors 144 and 148) and ultrasonic sensors (for example, as sensor 124). This combination would allow for enables the real-time continuous measurement of water levels in a manhole while also providing additional water level information in the case of a surcharge when water exceeds the level of the ultrasonic sensor and begins to climb up the manhole. An infinite number of combinations of sensors is available, including any or all of the sensor types listed above.

Figure 4:
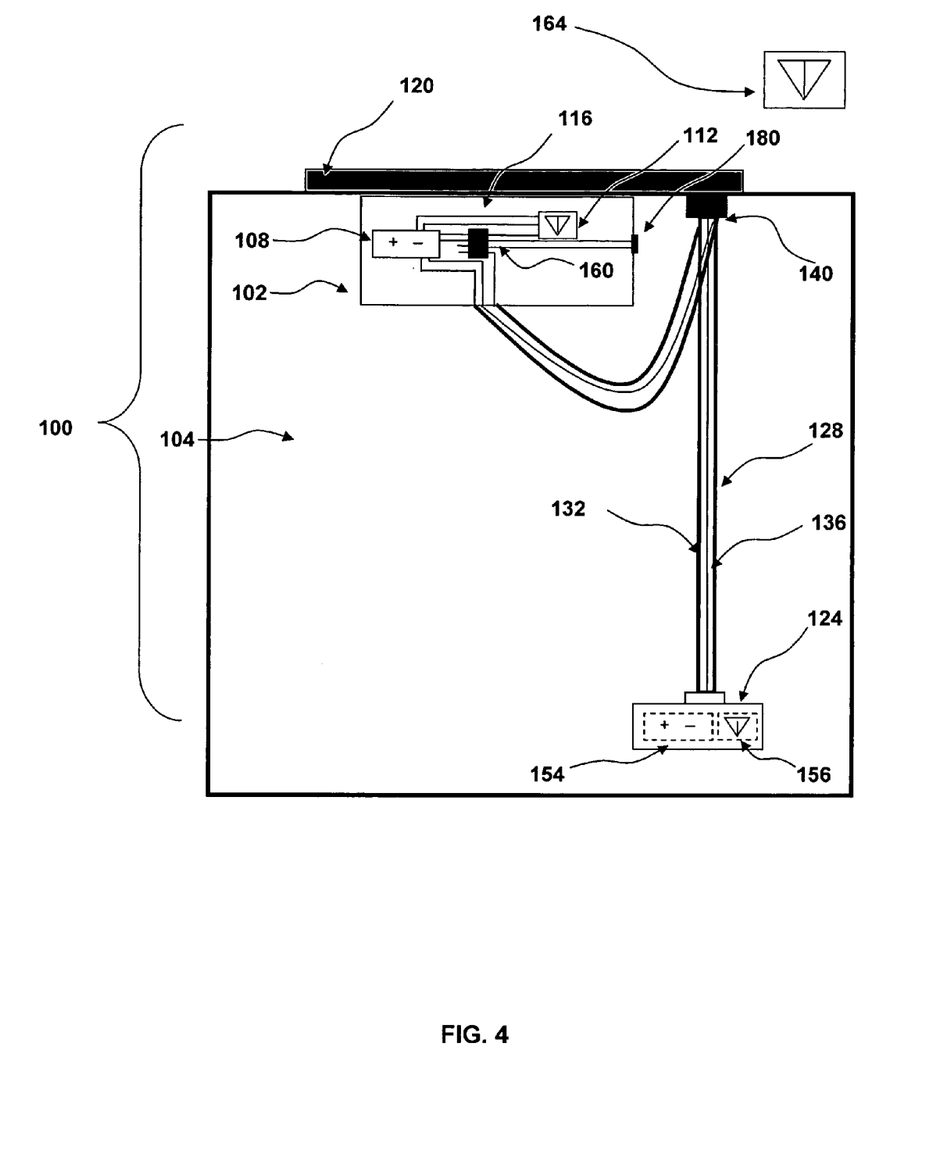
FIG. 4 shows another embodiment for an apparatus for monitoring environmental parameters within an enclosure.

A further alternative embodiment is shown in FIG. 4, in which the apparatus 100 has an additional attachment mechanism 140 attached to the cover 120 of the enclosure 104. The cable 128 proceeds from the communication device 112 to the additional attachment mechanism 140, and then descends from it. The additional attachment mechanism 140 may be attached to the cover 120 by glue, threaded bolts, rivets, metal screws, tape, epoxy, staples, nails, adhesive strips, or magnets. In some embodiments, the additional attachment mechanism is detachable from the cover of the enclosure, such that the additional attachment mechanism may be moved from time to time to improve the position of the sensor. The additional attachment mechanism 140 may, as a non-limiting example, be attached to the cover 120 by neodymium magnets. The additional attachment mechanism 140 may lend itself to repositioning, or may be attached so as to be difficult to reposition once a position has been selected. The additional attachment mechanism 140 may alternatively be attached somewhere within the enclosure 104. The additional attachment mechanism 140 may be a hook and ring through which the cable 128 passes. The ability to reposition the sensor 124 (with or without additional sensors as shown in FIG. 3) by use of an additional attachment mechanism 140 provides for more variation in placement of the sensors to avoid the problems discussed above, and may allow for flexible reconfiguration of the apparatus 100 while still offering the user an opportunity to more securely or permanently attach other elements (such as communication device 112, power source 108, or processor 160) to the cover 120 of the enclosure 104. The equipment may be moved from time to time (on the order of days, weeks, months, or years), or whenever a present location becomes suboptimal, due to interference or damage or the need for replacement of parts.

As a non-limiting example of a form in which the present inventive subject matter may be provided to a user, a complete suite may be provided to a user, which includes the communication device 112, power source 108, processor 160, one or more sensors 124 able to perform real-time alarm generation, a second communication device 164 which can provide user interfaces for configuration of the sensors 124 or processor 160, and software and/or equipment for management of the data provided by the sensors 124 by way of the communication devices 112, 160. However, this is one example of providing the present inventive subject matter, and more or fewer elements may be provided, depending on the needs of the end user.

The following two figures describe methods associated with monitoring of environmental parameters within an enclosure. While the steps of these methods are disclosed in one order, many other orders are possible, and the following descriptions are meant only to provide one example of an order of steps for performing the disclosed method. These steps may be reordered and resequenced, and some steps may be omitted. As non-limiting examples, in FIG. 5, the communication device may be connected to the power source (step 204) before the communication device is attached to the cover of the enclosure (step 200), and the step of attaching an additional attachment mechanism (216) is entirely optional.

Figure 5:
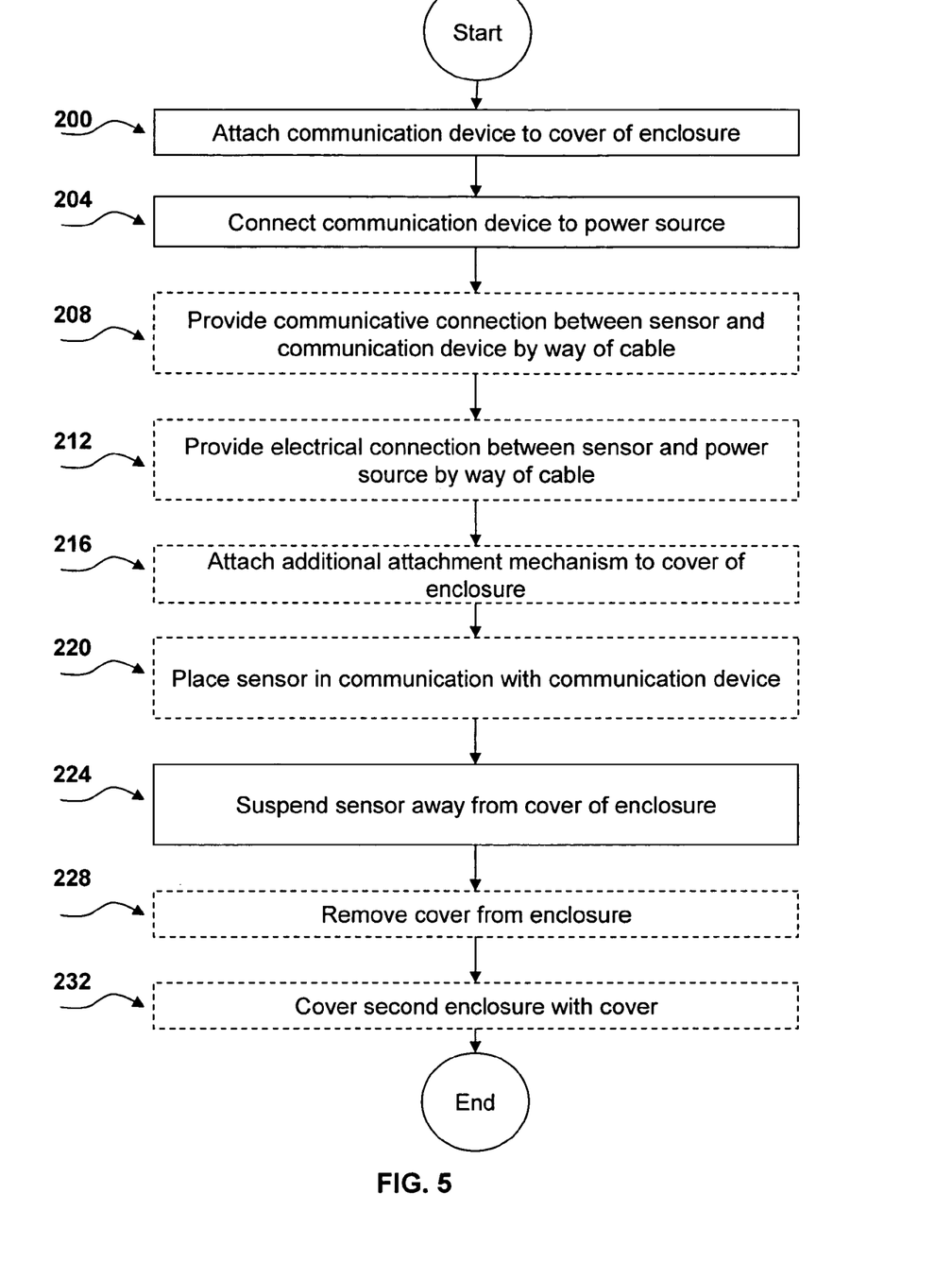
FIG. 5 charts a method for providing a monitor of environmental parameters within an enclosure.

FIG. 5 charts a method for providing a monitor of environmental parameters within an enclosure. The method includes attaching a communication device to a cover of the enclosure (step 200). Many methods of attachment are disclosed above, including the use of a package or attachment mechanisms as described above. The communication device is connected to a power source (step 204). A communicative connection between a sensor or sensors and the communication device is provided by way of a cable (step 208). An electrical connection is also provided between the sensor(s) and the communication device by way of this cable or another cable (step 212). Of course, this is one example, and the connections may also be provided wirelessly, and/or the sensor(s) may comprise their own power supplies.

An additional attachment mechanism may be attached to the cover or other part of the enclosure (step 216), from which the cable and/or sensor(s) may be suspended.

Whether by hardware or by mere logical configuration, the sensor(s) may be placed in communication with the communication device (step 220) attached to the cover of the enclosure (which of course may communicate with other communication devices outside of the enclosure). Finally, the sensor(s) may be suspended away from the cover of the enclosure (step 224), either descending directly from the cover or instead from an additional attachment mechanism.

From time to time, the method can optionally include removing a cover from the enclosure (step 228) and covering a second enclosure with the cover (step 232). In this way, an entire sensor configuration (including one or more sensors suspended from a cable) may be moved from one enclosure to another.

Figure 6:
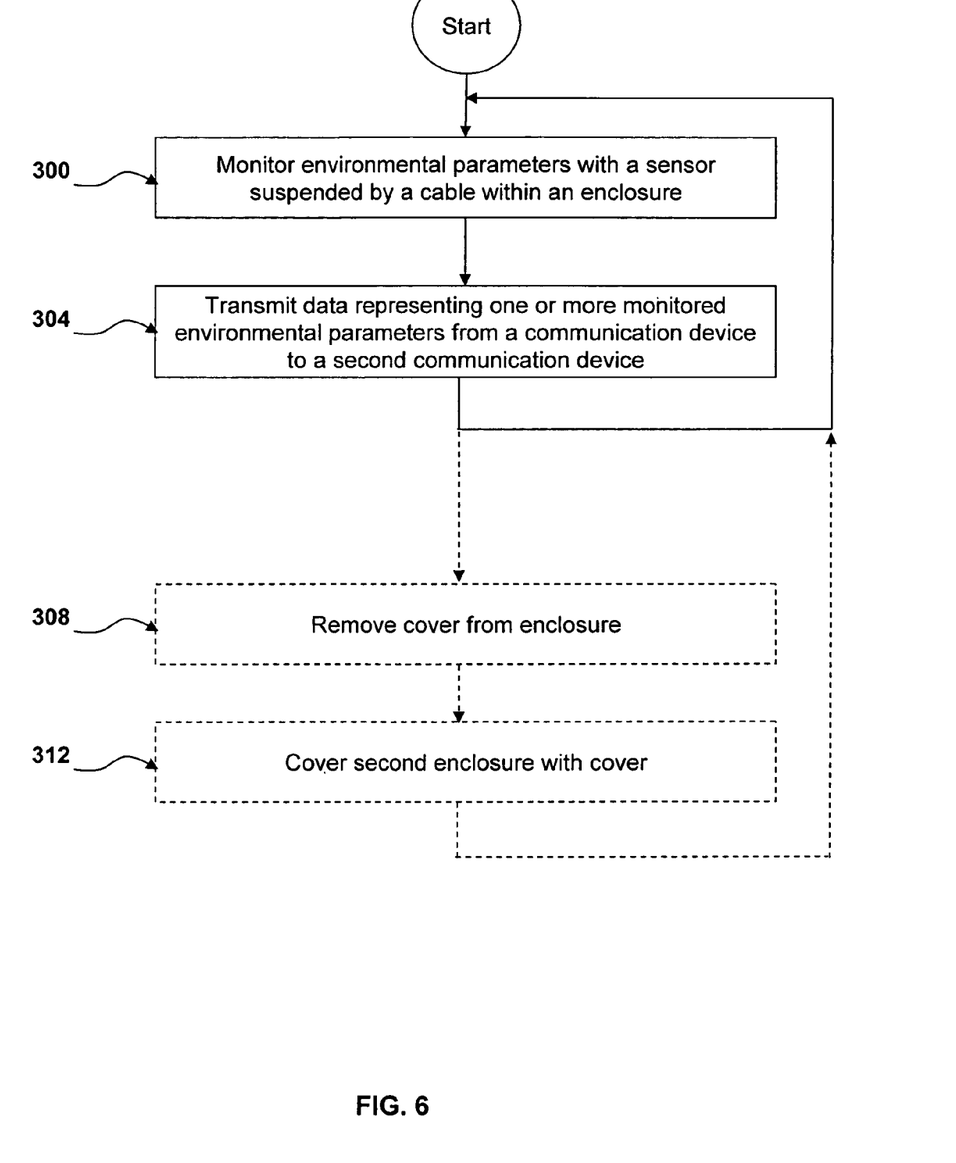
FIG. 6 charts a method for monitoring environmental parameters within an enclosure.

FIG. 6 charts a method for monitoring environmental parameters within an enclosure. The method includes monitoring one or more environmental parameters with a sensor suspended by a cable within an enclosure (step 300), and transmitting data representing one or more monitored environmental parameters from a communication device to a second communication device (step 304). This process may be repeated for any duration of time, and the timing of transmitting data and monitoring data are quite flexible. As a non-limiting example, each suspended sensor may sample at its own rate, some on the order of milliseconds and others with delays on the order of days. Electronics may accumulate the sample measurements and store them in memory, and transmit the measurements on a schedule or upon request. Alternatively, the data may be transmitted as soon as it is acquired. A processor may also combine the acquired data in a logical way and transmit one or more derived values from this data (such as, as a non-limiting example, an average).

From time to time, the method can optionally include removing a cover from the enclosure (step 308) and covering a second enclosure with the cover (step 312). In this way, an entire sensor configuration (including one or more sensors suspended from a cable) may be moved from one enclosure to another.

Figure 7:
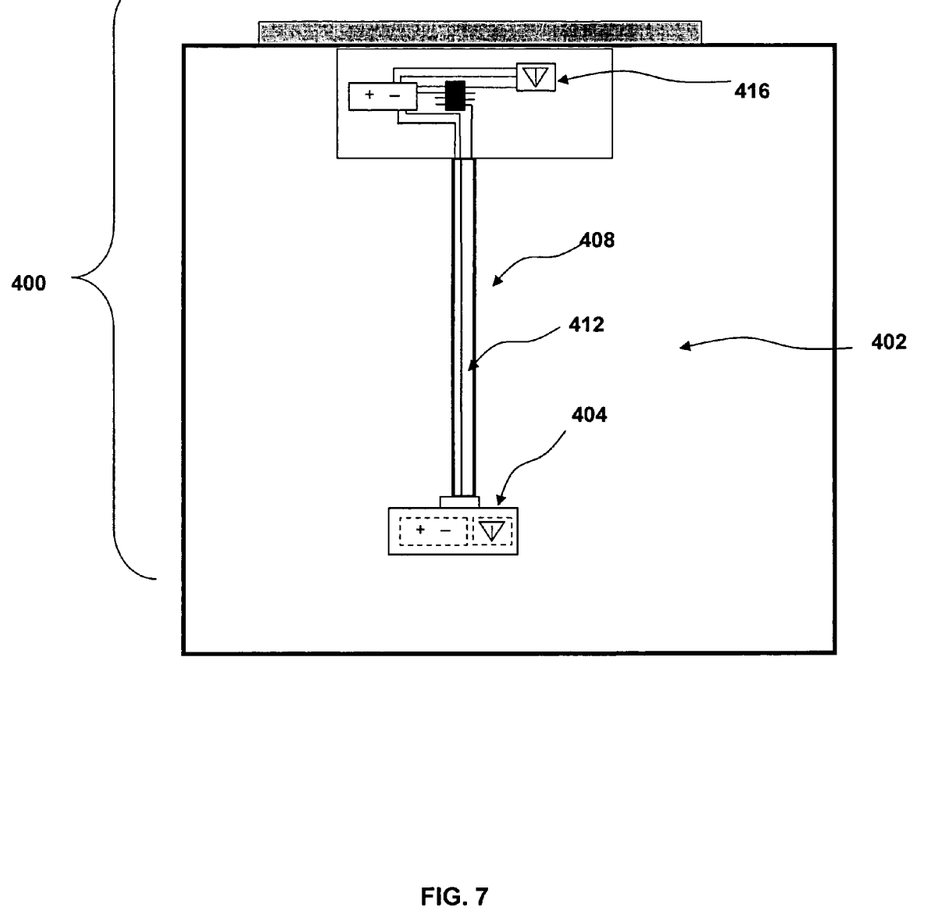
FIG. 7 shows an example of a system for monitoring environmental parameters within an enclosure.

FIG. 7 shows an example of a system 400 for monitoring environmental parameters within an enclosure 402. The system includes means for monitoring one or more environmental parameters (as a non-limiting example, a sensor 404), means for suspending the monitoring means within an enclosure (as a non-limiting example, cable 408 comprising a communicative connection 412 between sensor 404 and communication device 416), and means for transmitting data to a communication device outside of the enclosure (as a non-limiting example, communication device 416). The data transmitted may represent one or more environmental parameters monitored by the sensor 404. Again, the system can include any or all of the modifications disclosed above.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, one or more elements can be rearranged and/or combined, or additional elements may be added. Thus, the present invention is not intended to be limited to the embodiments shown herein but is to be accorded the widest scope consistent with the principles and novel features disclosed herein.

Having described the invention in detail and by reference to the embodiments thereof, it will be apparent that modifications and variations are possible, including the addition of elements or the rearrangement or combination or one or more elements, without departing from the scope of the invention which is defined in the appended claims.

What is claimed is:

1. An apparatus for monitoring environmental parameters within a manhole, the apparatus comprising:
   an environmentally protected power source;
   an environmentally protected communication device connected to the power source, the communication device being attached to an underside of a cover of the manhole;
   a single cable which provides all of a suspension, electrical and communicative connectivity for a plurality of sensors, enabling at least a first connected sensor from said plurality of sensors to be placed away from the cover of the manhole; and
   at least a first sensor connected to the cable.

2. The apparatus of claim 1, comprising an attachment mechanism attached, away from the communication device, to the cover, wherein the cable is attached to the attachment mechanism and descends from the additional attachment mechanism in a position that is not directly under the communication device.

3. The apparatus of claim 2, wherein the attachment mechanism is detachable from the cover, such that the attachment mechanism may be moved from time to time to improve a position of the sensor.

4. The apparatus of claim 1, further comprising a second sensor attached to the cable, wherein the first sensor and second sensor are apart from each other along the cable.

5. The apparatus of claim 4, further comprising at least one further sensor or sensors attached to the cable, wherein the further sensor or sensors is or are apart from the first sensor and second sensor.

6. The apparatus of claim 1, wherein the first sensor is connected to a second power source and a wireless communicator for communicating wirelessly with the communication device.

7. The apparatus of claim 1, further comprising a processor connected to the power source, wherein the first sensor is connected to the communication device by way of the processor.

8. The apparatus of claim 1, wherein the communication device is a wireless communication device which communicates with at least a second communication device outside of the manhole.

9. The apparatus of claim 1, wherein the first sensor monitors one or more of: humidity, moisture, temperature, gas content, water level, water quality, flow rates, vibration, acoustic levels and content, optical levels and content, and opening or closing of the cover.

10. The apparatus of claim 1, wherein the first sensor conducts real-time, continuous sensing.

11. The apparatus of claim 1, wherein the first sensor is connected to a wireless communicator for communicating wirelessly with the communication device.

12. The apparatus of claim 1, wherein the first sensor is configured to sense one or more of: power current flow, power voltage, telecommunications measurements, natural gas pressure, natural gas flow, petrochemical pressure, petrochemical flow, security measurements, fire detection, chemical detection, biological detection, fluid level detection, fluid flow detection.

13. The apparatus of claim 1, wherein the power source, the communication device, and the first sensor are positioned so as to be movable with the cover.

14. The apparatus of claim 1, wherein the power source is located outside of the manhole.

15. A method for providing a monitor of environmental parameters within a manhole, the method comprising:
   attaching an environmentally protected communication device to an underside of a cover of the manhole;
   connecting the communication device to an environmentally protected power source; and
   suspending at least a first sensor away from the cover, wherein the at least first sensor is suspended using a single cable connected to the power source, the cable providing all of a suspension, electrical and communicative connectivity for a plurality of sensors.

16. The method of claim 15, the method further comprising attaching an additional attachment mechanism to the cover, away from the communications device, wherein at least the first sensor is suspended from the additional attachment mechanism in a position that is not directly under the communications device.

17. The method of claim 15, further comprising:
   removing a cover from the manhole; and
   covering a second manhole with the cover, wherein the sensor is suspended by the cable from the cover.

18. The method of claim 15, further comprising:
   monitoring one or more environmental parameters with the first sensor; and
   transmitting data from the communication device to a second communication device, the data representing one or more monitored environmental parameters.

19. A system for monitoring environmental parameters within a manhole, comprising:

means for providing power;

means for communication, being attached to an underside of a cover of the manhole;

means for monitoring one or more environmental parameters;

means for singly providing suspension, power, and communication with at least one of a plurality of the monitoring means;

means for attaching the means for singly providing to a position away from directly under the means for communication, the means for attaching being attached to the underside of the cover; and means for transmitting data to an outside communication device outside of the manhole, the data representing one or more monitored environmental parameters.

20. The apparatus of claim 19, wherein the means for attaching is magnetic.

* * * * *